US008070398B2

(12) United States Patent
Durfee

(10) Patent No.: US 8,070,398 B2
(45) Date of Patent: Dec. 6, 2011

(54) MULTI-BLADE SELF FEED BIT

(75) Inventor: LaVerne R. Durfee, Harmony, NC (US)

(73) Assignee: Irwin Industrial Tool Company, Huntersville, NC (US)

(*) Notice: Subject to any disclaimer, the term of this patent is extended or adjusted under 35 U.S.C. 154(b) by 961 days.

(21) Appl. No.: 12/033,057

(22) Filed: Feb. 19, 2008

(65) Prior Publication Data

US 2009/0208302 A1 Aug. 20, 2009

(51) Int. Cl.
*B23B 51/00* (2006.01)

(52) U.S. Cl. ......... 408/213; 408/214; 408/225; 408/227

(58) Field of Classification Search .................. 408/213, 408/214, 223–225, 227; *B23B 51/00*
See application file for complete search history.

(56) References Cited

U.S. PATENT DOCUMENTS

| | | | | |
|---|---|---|---|---|
| 8,349 | A | 8/1834 | Newton | |
| 29,793 | A | 8/1860 | Ives | |
| 29,883 | A | 9/1860 | Hathaway | |
| 141,324 | A | 7/1873 | Clark | |
| 242,362 | A | 5/1881 | Parmelee | |
| 285,440 | A | 9/1883 | Swan | |
| 287,538 | A | 10/1883 | Hall | |
| 298,786 | A | 5/1884 | Shaler | |
| 404,197 | A | 5/1889 | Irwin | |
| 413,159 | A | 10/1889 | Bailey | |
| 443,297 | A | 12/1890 | Sellers | |
| 461,897 | A | 10/1891 | Ford | |
| 530,923 | A | 12/1894 | Brown | |
| 781,652 | A | 2/1905 | Hiatt | |
| 808,245 | A | 12/1905 | Lund | |
| 877,592 | A | 1/1908 | Parry et al. | |
| 893,162 | A | 7/1908 | Hackett | |
| 1,139,198 | A | 5/1915 | Lund | |
| 1,185,380 | A * | 5/1916 | Davis | 408/205 |
| 1,389,578 | A | 9/1921 | Charlton | |
| 1,410,534 | A | 3/1922 | Stein | |
| 1,493,439 | A | 5/1924 | Steadman | |
| 1,557,900 | A | 10/1925 | Thompson | |
| 1,910,143 | A | 5/1933 | Arenz | |

(Continued)

FOREIGN PATENT DOCUMENTS

CH 665979 A5 6/1988

(Continued)

OTHER PUBLICATIONS

Swedish Patent and Registration Office, Opinion, Aug. 22, 2008.

(Continued)

*Primary Examiner* — Eric A Gates

(74) *Attorney, Agent, or Firm* — Dennis J. Williamson; Moore & Van Allen, PLLC

(57) ABSTRACT

A shank that has one end adapted to be connected to a chuck of a rotary tool. The opposite end of the shank supports a cutting head having a series of teeth formed on the edge thereof for cutting the periphery of the hole. A screw tip may be provided for feeding the bit into and through the wood. A plurality of cutting blades are provided for boring the interior of the hole. The cutting blades define a plurality of cutting edges that are disposed at different angles to a plan perpendicular to the axis of rotation.

31 Claims, 4 Drawing Sheets

U.S. PATENT DOCUMENTS

| | | | | |
|---|---|---|---|---|
| 2,358,077 | A | 9/1944 | Koett | |
| 2,613,710 | A | 10/1952 | Emmons | |
| 2,923,336 | A * | 2/1960 | Jacobs | 408/157 |
| 3,387,511 | A | 6/1968 | Ackart et al. | |
| 3,697,188 | A | 10/1972 | Pope | |
| 3,824,026 | A | 7/1974 | Gaskins | |
| 3,945,753 | A * | 3/1976 | Byers et al. | 408/201 |
| 4,065,224 | A | 12/1977 | Siddall | |
| 4,080,093 | A | 3/1978 | Maier | |
| 4,239,427 | A * | 12/1980 | Walton, II | 408/213 |
| 4,244,667 | A * | 1/1981 | Timmons | 408/201 |
| 4,536,107 | A | 8/1985 | Sandy et al. | |
| 4,594,034 | A * | 6/1986 | Maier | 408/230 |
| 4,625,593 | A | 12/1986 | Schmotzer | |
| 4,722,644 | A | 2/1988 | Scheuch | |
| 4,889,456 | A * | 12/1989 | Killinger | 408/224 |
| 4,898,503 | A | 2/1990 | Barish | |
| 5,221,166 | A | 6/1993 | Bothum | |
| 5,236,291 | A | 8/1993 | Agapiou et al. | |
| 5,244,319 | A | 9/1993 | Cochran | |
| 5,291,806 | A | 3/1994 | Bothum | |
| 5,478,176 | A | 12/1995 | Stedt et al. | |
| 5,695,304 | A * | 12/1997 | Ebert | 408/227 |
| 5,700,113 | A | 12/1997 | Stone et al. | |
| 5,800,101 | A | 9/1998 | Jindai et al. | |
| 5,820,319 | A | 10/1998 | Hull et al. | |
| 5,947,659 | A | 9/1999 | Mays | |
| 5,975,813 | A | 11/1999 | Schmotzer | |
| 5,975,814 | A * | 11/1999 | Pomp | 408/225 |
| 6,045,305 | A | 4/2000 | Plummer | |
| 6,089,337 | A | 7/2000 | Kleine et al. | |
| 6,261,034 | B1 | 7/2001 | Cselle | |
| 6,354,774 | B1 * | 3/2002 | Haughton et al. | 408/225 |
| 6,361,255 | B1 | 3/2002 | Schmotzer | |
| 6,394,714 | B2 * | 5/2002 | Eberhard | 408/211 |
| 6,612,788 | B2 | 9/2003 | Thomas et al. | |
| 6,652,203 | B1 | 11/2003 | Risen, Jr. | |
| D504,446 | S | 4/2005 | Kobayashi | |
| 7,101,125 | B2 | 9/2006 | Borschert et al. | |
| 7,153,067 | B2 | 12/2006 | Greenwood et al. | |
| 7,625,160 | B2 * | 12/2009 | Zeiler et al. | 408/213 |
| 7,661,911 | B2 * | 2/2010 | Zeiler et al. | 408/1 R |
| 2003/0035694 | A1 | 2/2003 | Liao | |
| 2003/0185640 | A1 | 10/2003 | Ito | |
| 2004/0156689 | A1 * | 8/2004 | Shen | 408/212 |
| 2005/0169720 | A1 | 8/2005 | Kobayashi | |
| 2005/0249563 | A1 | 11/2005 | Scott et al. | |
| 2006/0056930 | A1 | 3/2006 | Rompel | |
| 2006/0083595 | A1 | 4/2006 | Wiker | |
| 2007/0280798 | A1 * | 12/2007 | Zeiler et al. | 408/201 |
| 2008/0013816 | A1 | 1/2008 | Rimm et al. | |

FOREIGN PATENT DOCUMENTS

| | | | |
|---|---|---|---|
| DE | 3809356 | | 9/1989 |
| DE | 19707115 | | 8/1998 |
| DE | 20006541 | U1 | 8/2000 |
| DE | 102005005982 | | 1/2007 |
| FR | 2726782 | A1 | 5/1996 |
| GB | 681204 | | 10/1952 |
| GB | 2219229 | A | 12/1989 |
| JP | 08039319 | | 2/1996 |
| JP | 2003334710 | | 11/2003 |
| JP | 2003334711 | | 11/2003 |
| JP | 2004106393 | | 4/2004 |
| JP | 2006192820 | | 7/2006 |
| TW | 338709 | | 8/2008 |

OTHER PUBLICATIONS

Greenlee, www.greenlee.com, D'VersiBIT System, pp. 75-76.

French Patent Office; Preliminary Search Report; Nov. 18, 2010; issued in French Patent Application No. 0759585.

Mexican Patent Office; Official Action; Jan. 13, 2011; issued in Mexican Patent Application No. MX/a/2007/015282.

UK Intellectual Property Office; Examination Report; Sep. 17, 2010; issued in Application No. GB0723752.2.

Mexican Patent Office; Official Action; Oct. 1, 2010; issued in Mexican Patent Application No. MX/a12007/015282.

Australian Patent Office; Examiners Report; Jul. 16, 2010; issued in Australian Patent Application No. 2007237362.

GB Intellectual Property Office, Examination Report for Application No. GB0723752.2, dated May 12, 2010.

* cited by examiner

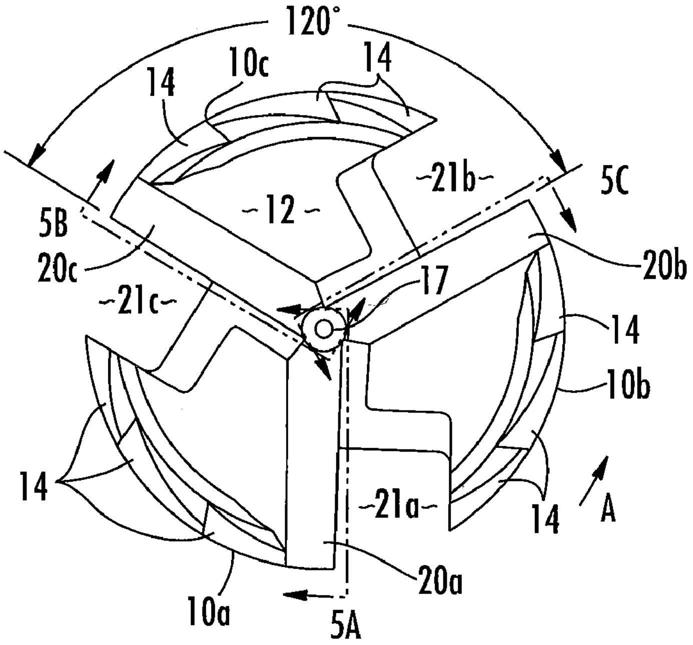
FIG. 4
FIG. 5A
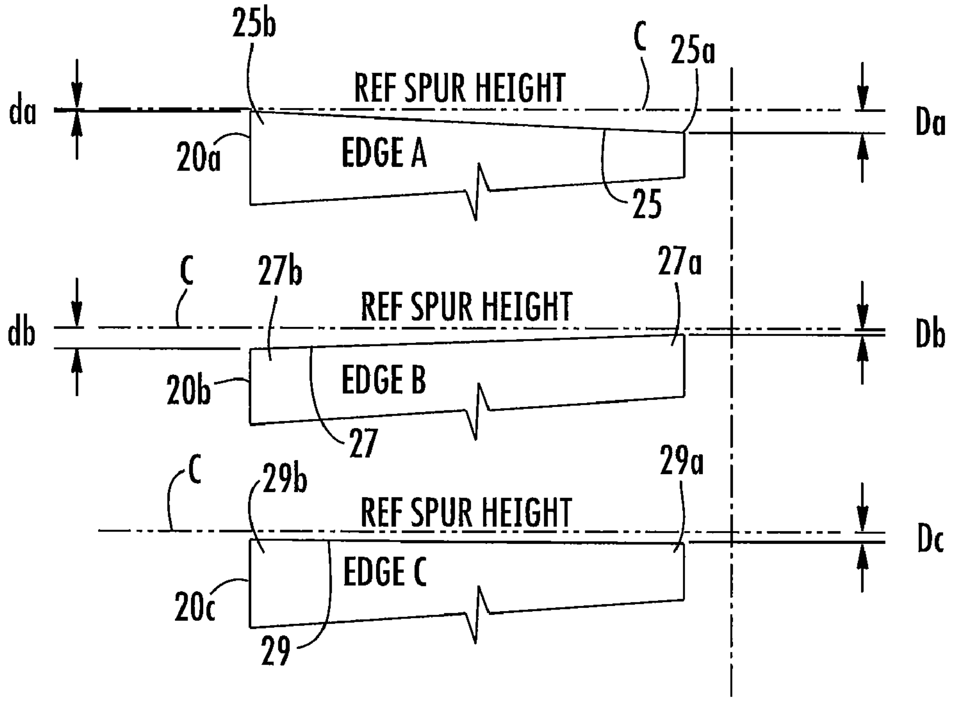
FIG. 5B
FIG. 5C

MULTI-BLADE SELF FEED BIT

The invention relates to self feed bits and more particularly to a self feed bit having a plurality of cutting edges.

BACKGROUND

Self feed bits for cutting large diameter holes in wood for pipe, conduit and other applications are known. These types of bits include a shank that has one end adapted to be connected to a chuck of a rotary tool such as a drill or power driver. The opposite end of the shank supports a cutting head having an annular cutting edge. A screw tip is provided for feeding the cutting member into and through the wood. A cutting member is disposed between the cutting edge and the tip. The bit is rotated at high speed such that the teeth score the edge of the hole and the cutting member bores the interior of the hole.

An improved self-feed bit is desired.

SUMMARY

A drill bit comprises a shank defining an axis of rotation. A cutting head is attached to the shank. A plurality of cutting blades defining a plurality of cutting edges extend from adjacent the axis of rotation to the edge of the cutting head. The cutting edges are disposed at different angles to a plane perpendicular to the axis of rotation.

BRIEF DESCRIPTION OF THE DRAWINGS

FIG. 4 is a top view of the embodiment of the drill bit of FIG. 1.

FIGS. 5A-5C are partial section views taken along lines 5A-5C, respectively, of Fig. showing the orientation of the blades of the embodiment of the drill bit of FIG. 1.

DETAILED DESCRIPTION OF EMBODIMENTS OF THE INVENTION

Figure 1A:
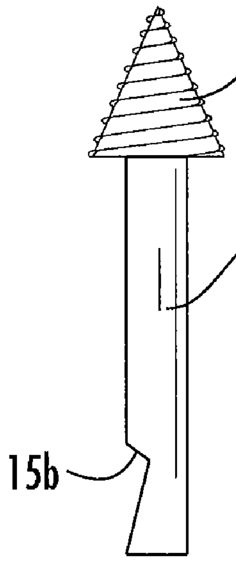
FIG. 1A shows the screw tip used in the embodiment of FIG. 1.
Figure 1:
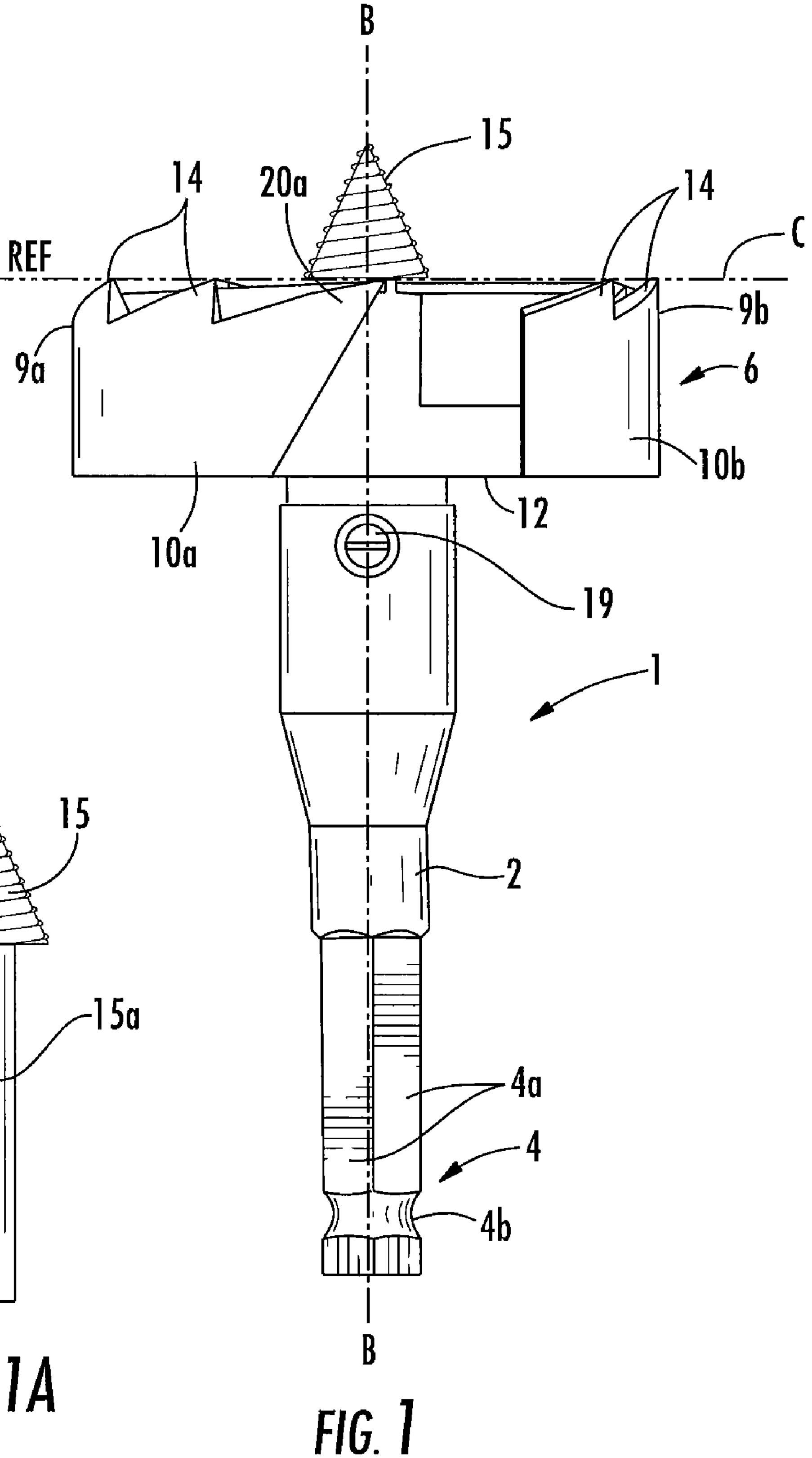
FIG. 1 is a front view of one embodiment of the drill bit of the invention.

Referring to the Figures an embodiment of a drill bit is shown generally at 1 and comprises a shank 2 having a quick coupling 4 disposed at a first end thereof. The quick connect coupling 4 may comprise a plurality flat faces 4*a* adapted to be received and retained in a chuck of a rotary tool such as a power screwdriver, drill or other power driver. A recess 4*b* may be formed around the circumference of the shank to be releasably engaged by the quick connect coupler of the rotary tool. Other configurations of shank 2 may also be used for coupling the drill bit to a rotary drive tool.

A generally cylindrical, cup shaped cutting head 6 is formed on the opposite end of shank 2 from quick connect coupling 4. The cutting head 6 comprises an annular wall comprising three wall portions 10*a*, 10*b* and 10*c* connected to shank 2 by a base 12. Each of the wall portions 10*a*, 10*b*, and 10*c* have an arcuate profile that together form a circular cutting edge. While the wall portions each define a portion of the circular cutting edge, it is to be understood that when the drill bit rotates the wall portions circumscribe and cut a round hole. Formed on the distal edges of the wall portions 10*a*, 10*b* and 10*c* are a plurality of teeth 14 that create the cutting edge. When the drill bit 1 is rotated about the rotational axis B-B the teeth 14 score the material being cut to create a clean cut around the periphery of the hole being drilled. A screw tip 15 is formed along the rotational axis B-B of the bit that engages the material being cut to feed the bit through the material.

Figure 2:
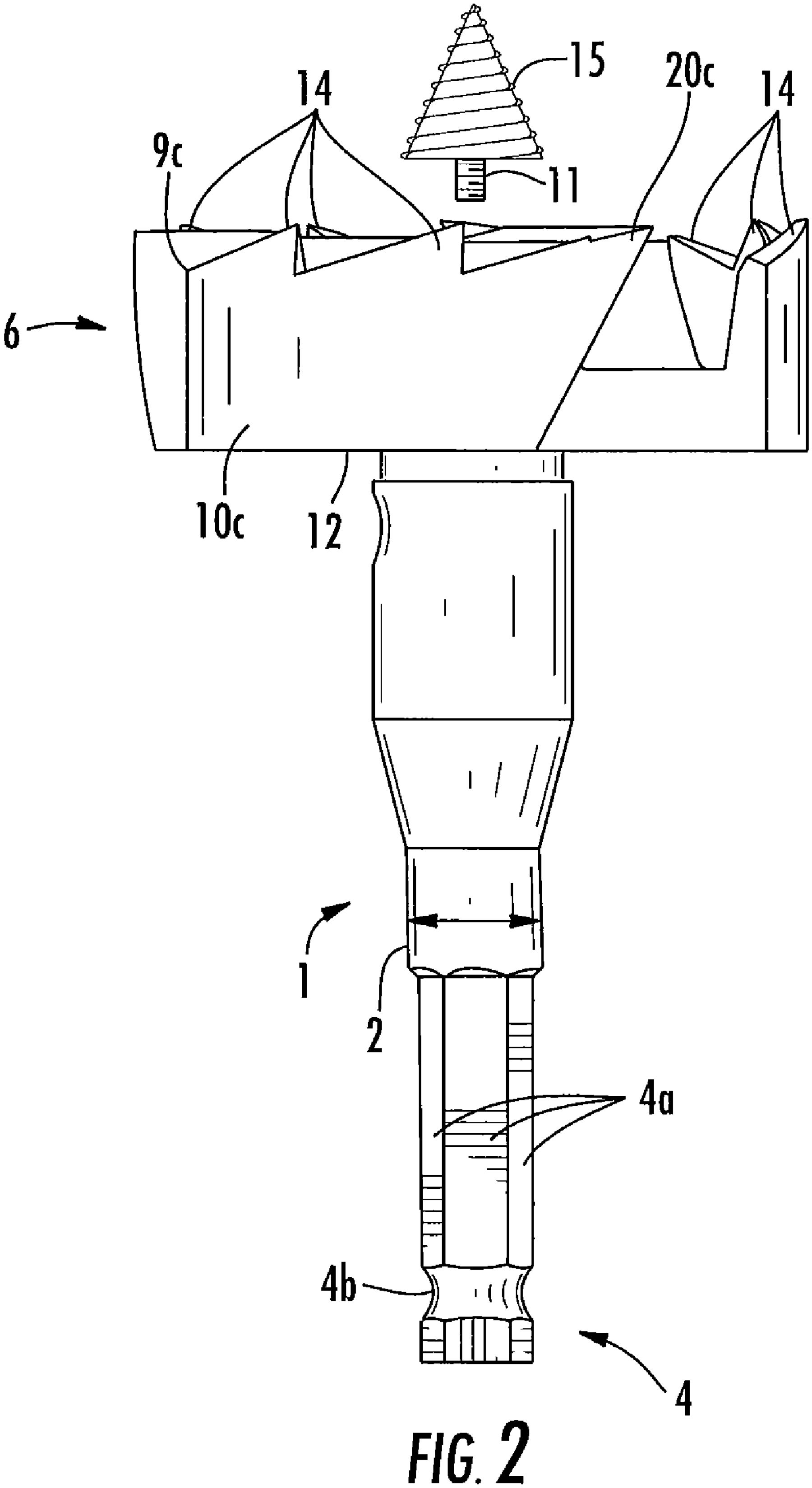
FIG. 2 is a partially exploded side view of the embodiment of the drill bit of FIG. 1.
Figure 3:
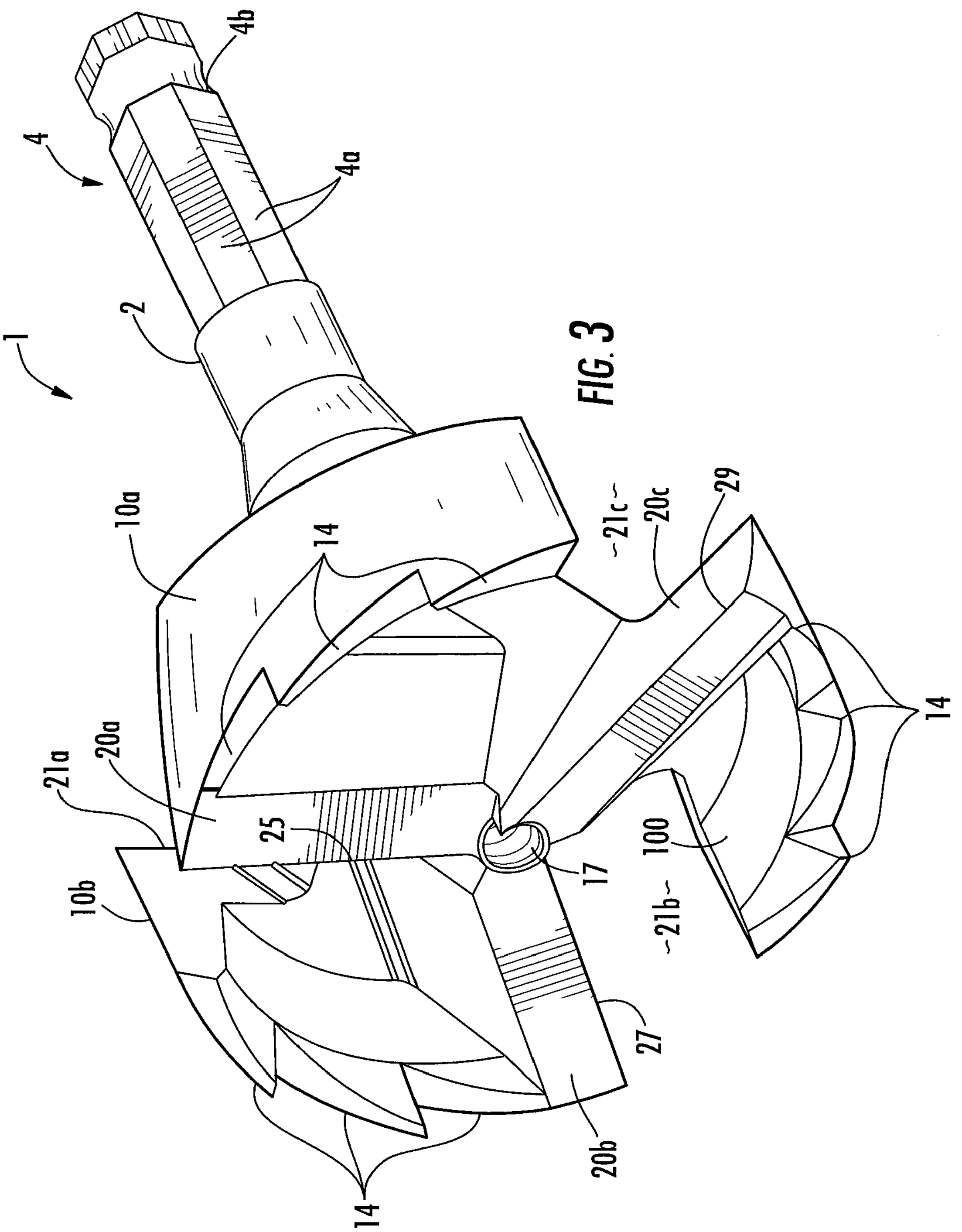
FIG. 3 is a perspective view of the embodiment of the drill bit of FIG. 1.

The screw tip 15 may be made removable from the remainder of the bit. The screw tip 15 may include a relatively long stem 15*a* as shown in FIG. 1A that extends into an axially aligned bore in the cutting head 6 and shank 2. A set screw 19 engages a notch 15*b* in the stem 15*a* to retain the screw tip 15 in place. In an alternate embodiment, the screw tip 15 may include external screw threads 11, FIG. 2, that mate with internal screw threads 17 on the bit to allow the screw tip 15 to be inserted on or removed from the bit.

A plurality of cutting blades or lifters 20*a*, 20*b* and 20*c* are formed on the cutting head 6. When the drill bit is rotated at high speed in the direction of arrow A, the cutting blades 20*a*, 20*b*, and 20*c* lift the material from the interior of the hole being drilled. Troughs 21*a*, 21*b* and 21*c* are formed between wall portions 10*a*, 10*b* and 10*c* and in base 12 in front of the cutting blades 20*a*, 20*b* and 20*c* to create open areas for the wood chips to be ejected from the drill bit during the drilling operation. The troughs 21*a*, 21*b* and 21*c* comprise gaps in the base 12 and gaps between the wall portions 10*a*, 10*b* and 10*c*. The troughs are located in front of the leading or cutting edges of cutting blades 20*a*, 20*b* and 20*c*, the leading edges or cutting edges being the forward edges of the cutting blades as the blades rotate in the direction of arrow A. In one embodiment, three such cutting blades are provided offset from one another 120° such that the cutting blades are evenly spaced about axis B-B. The cutting blades are arranged such that the inner portions of each of the blades at least partially circumscribe screw 15.

Referring to FIGS. 5A-C each of the cutting blades 20*a*, 20*b* and 20*c* are formed with a different orientation relative to the drill bit to increase the cutting efficiency of the bit. A reference spur height line C represents the plane defined by the distal edges of the spurs 14 and is oriented perpendicular to the axis of rotation B-B of the bit. Cutting blade 20*a* has a cutting edge 25 that is oriented at an angle relative to the reference spur height line C. The inner corner 25*a* of the cutting edge 25 is disposed below the reference spur height line C a greater distance $D_a$ than the distance $d_a$ that the outer corner 25*b* of the cutting edge is disposed below the reference spur height line C. As used herein inner corner refers to the portion of the cutting edge nearest the center axis B-B of the bit and the outer corner refers to the portion of the cutting edge nearest the spurs 14. Further, "below" as used herein means in the direction towards base 12. Cutting blade 20*b* has a cutting edge 27 that is oriented at an angle relative to the reference spur height line C where the inner corner 27*a* of the cutting edge 27 is disposed below the reference line a lesser distance $D_b$ than distance $d_b$ that the outer corner 27*b* of the cutting edge 27 is disposed below the reference spur height line C. Cutting blade 20*c* has a cutting edge 29 that is oriented parallel to the reference spur height line C where the inner corner 29*a* of the cutting edge is disposed below the reference line the same distance $D_c$ as the outer corner 29*b* of the cutting edge. In one embodiment $D_c$ is dimensioned between $d_a$ and $D_b$ and $D_a$ and $d_b$. In one embodiment $d_a$ is equal to $D_b$ and $d_b$ is equal to $D_a$. Further, in one preferred embodiment $d_a$ and $D_b$ equal approximately 0.01 inches; $d_b$ and $D_a$ equal approximately 0.072 inches; and $D_c$ equals approximately 0.026 inches. The blades may be investment cast blanks of approximately 55 HRC and machined to the finished configurations.

When the bit is rotated the screw thread 15 feeds the bit 1 through the material being cut, the teeth 14 score the circumference of the hole being cut to create a smooth edge and the cutting blades 20*a*, 20*b* and 20*c* cut or lift material from the interior of the hole being cut. Using three blades distributes the cutting forces more equally around the bit. Also, by grinding the blades to have the orientations previously described with respect to FIGS. 5A-5C, each blade cuts a different segment of the hole. Blade 20*a* cuts the outer periphery of the hole, blade 20*b* cuts the inner portion of the hole and blade 20*c* cuts the middle portion of the hole between the outer periphery and the center portion. By spreading the forces around the bit and having the blades cut only a portion of the hole, the drill bit runs smoother than other designs and is safer for the operator to use.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A drill bit comprising:

a shank defining an axis of rotation;

a cutting head attached to said shank, said cutting head defining a circular cutting edge positioned about the axis of rotation and at least one cutting tooth arranged on the cutting edge, a plurality of cutting blades defining a plurality of cutting edges extending from the cutting edge to a point adjacent the axis of rotation, said cutting edges being disposed at different angles to a plane perpendicular to the axis of rotation where at least one of the cutting edges of the plurality of cutting edges is substantially parallel to said plane.

2. The drill bit of claim 1 wherein said plurality of cutting edges comprise a first cutting edge, a second cutting edge and a third cutting edge.

3. The drill bit of claim 2 wherein an inner corner of the first cutting edge is disposed closer to said plane than an outer corner of said first cutting edge.

4. The drill bit of claim 2 wherein an outer corner of the second cutting edge is disposed closer to said plane than an inner corner of said second cutting edge.

5. The drill bit of claim 2 wherein the third cutting edge is parallel to said plane.

6. The drill bit of claim 2 wherein an inner corner of the first cutting edge is disposed a first distance from said plane and an outer corner of said first cutting edge is disposed a second distance from said plane and wherein an outer corner of the second cutting edge is disposed said first distance from said plane and said inner corner of said second cutting edge is disposed said second distance from said plane.

7. The drill bit of claim 6 wherein the third cutting edge is disposed a third distance from said plane, said third distance being between said first distance and said second distance.

8. The drill bit of claim 2 wherein an inner corner of the first cutting edge is disposed a first distance from said plane and an outer corner of said first cutting edge is disposed a second distance from said cutting plane wherein said first distance is approximately 0.072 inches and said second distance is approximately 0.01 inches.

9. The drill bit of claim 8 wherein an outer corner of the second cutting edge is disposed said first distance from said plane and said inner corner of said second cutting edge is disposed said second distance from said plane.

10. The drill bit of claim 8 wherein the third cutting edge is disposed a third distance from said plane, said third distance being approximately 0.026 inches.

11. The drill bit of claim 2 wherein the first cutting edge, the second cutting edge and the third cutting edge are arranged symmetrically about the axis.

12. The drill bit of claim 1 further including a screw arranged along said axis of rotation.

13. The drill bit of claim 12 wherein said cutting blades at least partially circumscribe said screw.

14. The drill bit of claim 1 wherein said shank includes a quick release coupling.

15. The drill bit of claim 1 further including a trough in front of each of said plurality of cutting blades.

16. A drill bit comprising: a shank defining an axis of rotation;

a cutting head attached to said shank, said cutting head defining a circular cutting edge positioned about the axis of rotation and at least one cutting tooth arranged on the cutting edge; and a plurality of cutting blades extending from the cutting edge to a point adjacent the axis of rotation, each of said cutting blades being disposed at a different angle to a plane that extends perpendicular to the axis of rotation and through the cutting tooth.

17. The drill bit of claim 16 wherein said plurality of cutting blades comprise a first cutting edge, a second cutting edge and a third cutting edge.

18. The drill bit of claim 17 wherein an inner corner of the first cutting edge is disposed closer to said plane than an outer corner of said first cutting edge.

19. The drill bit of claim 17 wherein an outer corner of the second cutting edge is disposed closer to said plane than an inner corner of said second cutting edge.

20. The drill bit of claim 17 wherein the third cutting edge is parallel to said plane.

21. The drill bit of claim 17 wherein an inner corner of the first cutting edge is disposed a first distance from said plane and an outer corner of said first cutting edge is disposed a second distance from said plane and wherein an outer corner of the second cutting edge is disposed said first distance from said plane and said inner corner of said second cutting edge is disposed said second distance from said plane.

22. The drill bit of claim 21 wherein the third cutting edge is disposed a third distance from said plane, said third distance being between said first distance and said second distance.

23. The drill bit of claim 17 wherein an inner corner of the first cutting edge is disposed a first distance from said plane and an outer corner of said first cutting edge is disposed a second distance from said plane wherein said first distance is approximately 0.072 inches and said second distance is approximately 0.01 inches.

24. The drill bit of claim 23 wherein an outer corner of the second cutting edge is disposed said first distance from said plane and said inner corner of said second cutting edge is disposed said second distance from said plane.

25. The drill bit of claim 23 wherein the third cutting edge is disposed a third distance from said plane, said third distance being approximately 0.026 inches.

26. The drill bit of claim 17 wherein the first cutting edge, the second cutting edge and the third cutting edge are arranged symmetrically about the axis.

27. The drill bit of claim 16 further including a screw arranged along said axis of rotation.

28. The drill bit of claim 27 wherein said cutting blades at least partially circumscribe said screw.

29. The drill bit of claim 16 wherein said shank includes a quick release coupling.

30. The drill bit of claim 16 further including a trough in front of each of said plurality of cutting blades.

31. A drill bit comprising:

a shank defining an axis of rotation;

a cutting head attached to said shank, three cutting blades defining a first cutting edge, a second cutting edge and a third cutting edge wherein an inner corner of the first cutting edge is disposed closer to said plane than an outer corner of said first cutting edge; an outer corner of the second cutting edge is disposed closer to said plane than an inner corner of said second cutting edge; and wherein the third cutting edge is parallel to said plane.

* * * * *